US009405512B2

(12) United States Patent
Kersters

(10) Patent No.: US 9,405,512 B2
(45) Date of Patent: Aug. 2, 2016

(54) REJUVENATION OF LEGACY CODE INTO RESOURCES-ORIENTED ARCHITECTURES

(71) Applicant: Christian Kersters, Donceel (BE)

(72) Inventor: Christian Kersters, Donceel (BE)

(73) Assignee: CA, Inc., New York, NY (US)

( * ) Notice: Subject to any disclaimer, the term of this patent is extended or adjusted under 35 U.S.C. 154(b) by 163 days.

(21) Appl. No.: 14/264,550

(22) Filed: Apr. 29, 2014

(65) Prior Publication Data

US 2015/0309866 A1    Oct. 29, 2015

(51) Int. Cl.
*G06F 11/00*    (2006.01)
*G06F 9/44*    (2006.01)

(52) U.S. Cl.
CPC ........................................ *G06F 8/00* (2013.01)

(58) Field of Classification Search
USPC .......................................................... 714/25
See application file for complete search history.

(56) References Cited

U.S. PATENT DOCUMENTS

2005/0188051 A1\* 8/2005 Sneh ..................... G06F 17/243 709/213
2011/0276169 A1\* 11/2011 Bourg, Jr. ......... G05B 19/41865 700/109

OTHER PUBLICATIONS

Cindy Peake, "The ROI of Developing Application with CA Gen", White Paper, Maximize Your Application Development ROI, Jan. 2010.

\* cited by examiner

*Primary Examiner* — Sarai Butler
(74) *Attorney, Agent, or Firm* — Baker Botts L.L.P.

(57) ABSTRACT

A method for building a web-based application may include defining a scope of the web-based application, via a programming module, based on a plurality of parameters of a non-web-based application, and defining an error-handling mechanism based on an error-handling mechanism of the non-web-based application. The method may further include defining a plurality of resources for the web-based application, defining the mechanism of function for each resource of the plurality of resources, and generating the web-based application.

18 Claims, 3 Drawing Sheets

REJUVENATION OF LEGACY CODE INTO RESOURCES-ORIENTED ARCHITECTURES

BACKGROUND

The disclosure relates generally to extending the reach of legacy code, and more specifically to a system and method for rejuvenation of legacy code into resource-oriented architectures.

SUMMARY

According to one embodiment of the disclosure, a method for building a web-based application may include defining a scope of the web-based application, via a programming module, based on a plurality of parameters of a non-web-based application, and defining an error-handling mechanism based on an error-handling mechanism of the non-web-based application. The method may further include defining a plurality of resources for the web-based application, defining the mechanism of function for each resource of the plurality of resources, and generating the web-based application.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
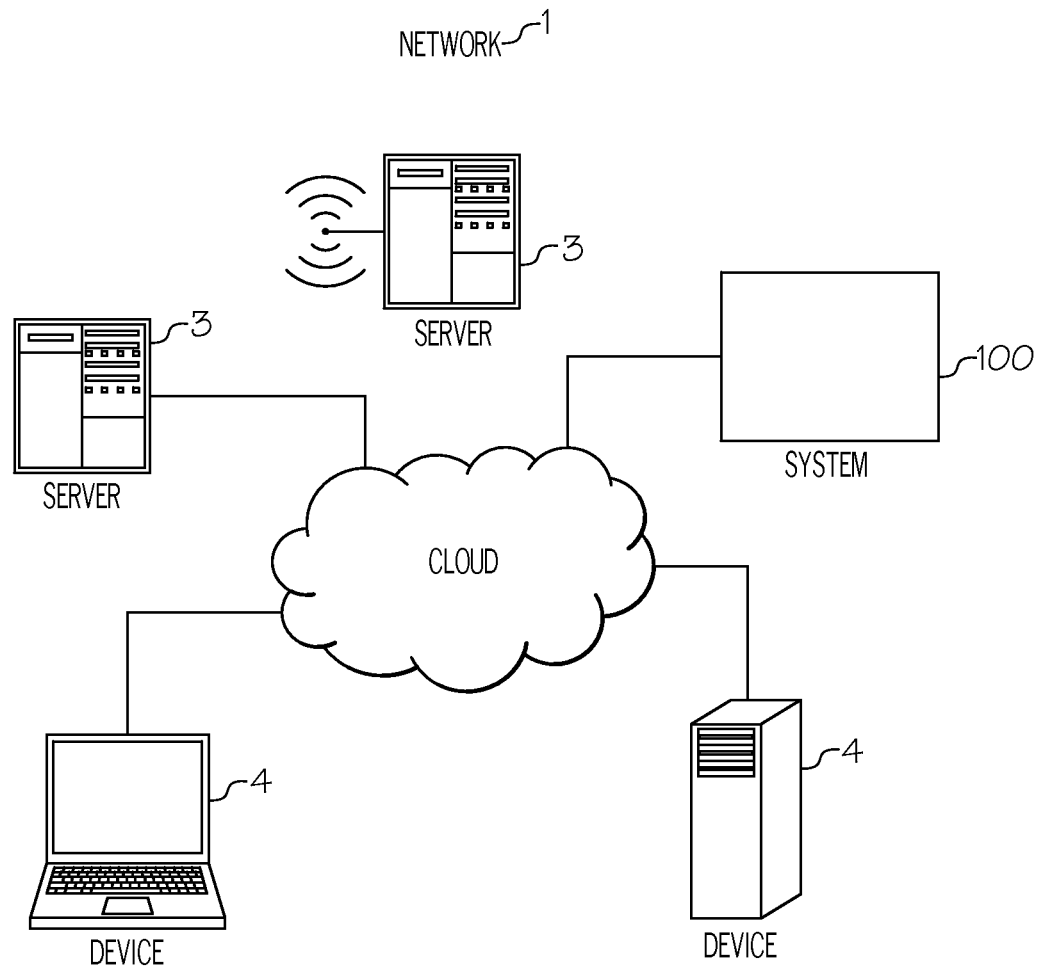
FIG. 1 illustrates a block diagram of a network for a user to access an application rejuvenation module, in accordance with a particular embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to FIG. 1, a network 1 allows a user to access and use an application rejuvenation module. The application rejuvenation module may be internally provided or sourced through third parties. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Example items may include network 1, cloud 2, servers 3, and devices 4.

Moreover, network 1 may comprise one or more systems 100 that may provide an application rejuvenation module. System 100 may be, for example, one or more of a general purpose computing device, a specialized computing device, a wired device, a wireless device, a mainframe device, an infrastructure device, a monitoring device, and any other device configured to provide the application rejuvenation module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, legacy code information, document content information, information on the consequences of user operations, and other information provided by service providers and users. By collecting the available information from network 1, cloud 2, servers 3, devices 4, and other devices connected to cloud 2, system 100 may perform one or more tasks associated with using the application rejuvenation module, which is discussed in more detail below. In some configurations, one or more of servers 3 and devices 4 may comprise system 100. In other configurations, system 100 may be separate from servers 3 and devices 4.

In the last twenty to thirty years, numerous computer applications have been developed in a wide variety of code (e.g., COBOL, C, C++, JAVA, C#, etc.). The "legacy" applications (i.e., non-web-based application) written in these computer languages, however, are presented in their own unique environments and infrastructures. For example, JAVA utilizes runtime libraries, but no such infrastructure is available in COBOL, C, or C++. Thus, taking these applications and transforming and/or restoring them (i.e., rejuvenating them) to a web-based environment (e.g., using a Resources-Oriented Architecture ("ROA"), and the associated technology behind ROA, called Representational State Transfer ("REST")), is difficult. As a result of this difficulty in "converting" an application from a "base" code to a web-based environment, and the requisite knowledge of not only the base code but also the web-based environment code (i.e., REST concepts) to implement this conversion, developers often simply re-write the legacy application in the new code environment. However, this process is onerous, inefficient, risky, and costs developers valuable time and energy that could otherwise be dedicated to other endeavors.

The teachings of the present disclosure may provide an application rejuvenation module that is useful for developers who want to re-use legacy applications in a REST-based (i.e., web-based) environment. In particular, the teachings of this disclosure enable developers to use the application rejuvenation module to convert legacy applications to REST-based applications accessible from the web without any knowledge of the concepts of REST and how it is implemented.

Figure 2:
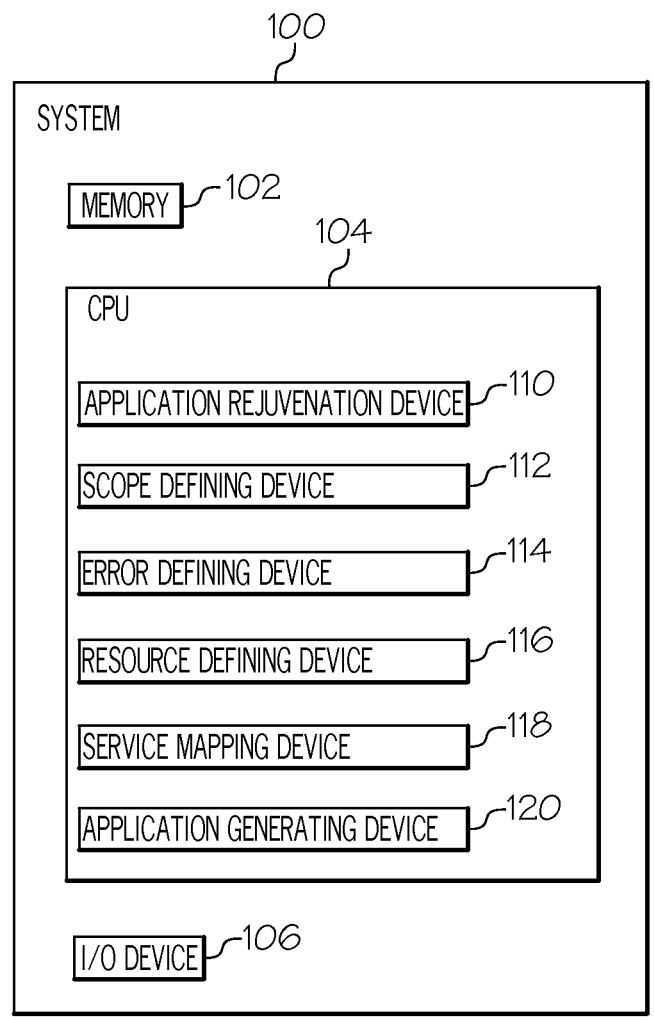
FIG. 2 illustrates a block diagram of a system for presenting the application rejuvenation module, in accordance with a particular embodiment of the present disclosure.

Referring now to FIG. 2, system 100, which may provide an application rejuvenation module, is now described. System 100 may reside on one or more networks 1. System 100 may comprise a memory 102, a central processing unit ("CPU") 104, and an input and output ("I/O") device 106.

Memory 102 may store computer-readable instructions that may instruct system 100 to perform certain processes. As discussed above, memory 102 may comprise, for example, RAM, ROM, EPROM, Flash memory, or any suitable combination thereof. In particular, when executed by CPU 104, the computer-readable instructions stored in memory 102 may instruct CPU 104 to operate as one or more devices.

CPU 104 may operate as one or more of an application rejuvenation device 110. Application rejuvenation device 100 may comprise one or more of a scope defining device 112, an error defining device 114, a resource defining device 116, a service mapping device 118, and an application generating device 120.

I/O device 106 may receive one or more of data from networks 1, data from other devices connected to system 100, and input from a user and provide such information to CPU 104. I/O device 106 may transmit data to networks 1, may transmit data to other devices connected to system 100, and may transmit information to a user (e.g., display the information via a display device). Further, I/O device 106 may implement one or more of wireless and wired communication between system 100 and other devices.

Figure 3:
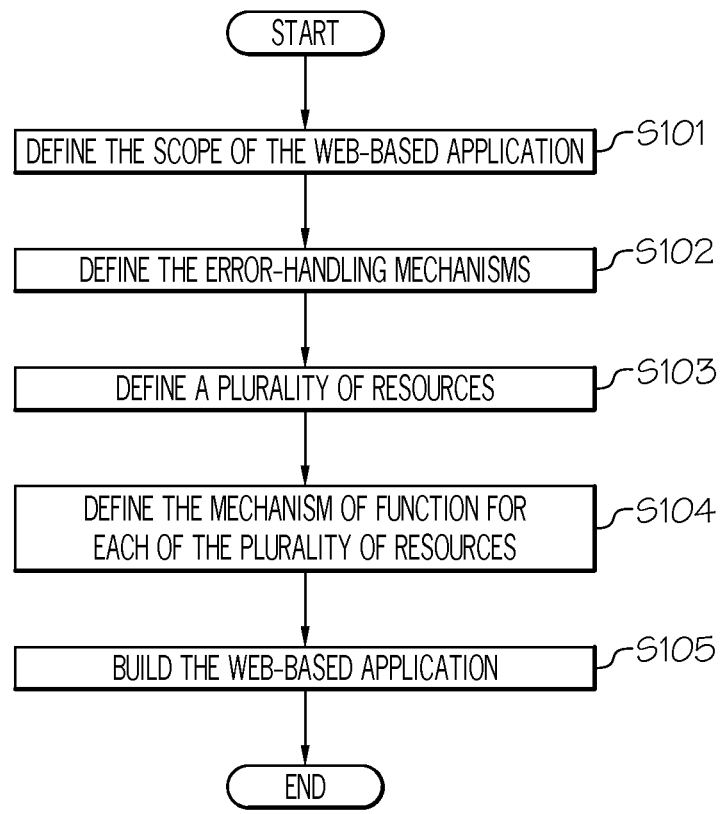
FIG. 3 illustrates a flow chart of a method for rejuvenating a legacy code via the application rejuvenation module, in accordance with a particular embodiment of the present disclosure.

Referring now to FIG. 3, processes performed by application rejuvenation device 110 are now described. In particular, application rejuvenation device 110 may receive user-selected settings and variables via I/O device 106, and may store such information in memory 102 or another suitable memory. In S101, application rejuvenation device 110, operating as scope defining device 112, defines the scope of the web-based application. For example, in this step, the global settings for the web-based (e.g., REST-based) application are defined within a web application programming interface ("API," e.g., a Web API Designer for CA Gen made available by CA Technologies, see www.ca.com), which may include defining general settings and the scope of the application. General settings may define basic properties of the generated web API, and may include the name of the application, the REST framework targeted by the implementation, generic Internet Media Types (known as multipurpose internet mail extensions—"MIME") prefix of MIME types provided by the web API, and/or namespace of the documents exchanged with the web API. The scope of the application may be defined using complex variables to best fit the specifics of the existing application (i.e., the legacy application). For example, the complex variables may include semantically rich variable (e.g., entity types, which may map to data tables in a relational database, classes, specification and interface types in Object-Oriented languages or Component-Based development approaches), and variables without semantics (also called "work sets", structures, . . . ). Any of these kinds of variable (or subsets thereof) may be used to define resources for the target web-based application.

Next, in S102, application rejuvenation device 110, operating as error defining device 114, may define error-handling mechanisms for the target web-based application based on the error-handling mechanisms native to the legacy application. An issue with legacy applications is that these applications generally have different error-handling mechanisms depending on different programming languages used and different mechanism set in place by developers. The legacy code's native error-handling mechanisms (and definitions thereof), however, may carry critical information, and thus are important to integrate into the target web-based application. Thus, in this step, error-handling mechanism native to, and considered as standard and/or widespread, in the native legacy code, may be defined and specified. For example, the set of information that may be considered important to a user and/or application (e.g., mobile application) and which are processed by the web API include: an error code, which can help easily identify an error; an error message, which is a short description of the error; and a severity, which returns information that does not necessarily represent the error, but, more generally, includes feedback about the execution of a piece of legacy logic and/or code (which may be converted into "error" codes used by the web API). In addition, each error-handling mechanism may map their specific information to defined web API error handling attributes. Furthermore, the web API may have a default method of reporting errors, and may also include user-definable and/or custom error-handling mechanisms.

Then, in S103, application rejuvenation device 110, operating as resource defining device 116, may define a plurality of resources for the target web-based application. The step of defining the resources may include defining of attributes and services, and may include defining the interface to the resources (e.g., defining the web API that will be exposed to the World Wide Web). For example, a user may, via the application rejuvenation module, fetch relationships between resources and attributes (e.g., from the legacy application), define the scope of a number of entities, determine select attributes to use, manipulate the attributes, define the structure of the resources, etc. In particular, although this step may require the knowledge of how the legacy application works, it does not require a user to know how the web API (e.g., REST-based) application works. In addition, this step may also include defining services a user wants to make available to an end user for each resource selected.

Next, in S104, application rejuvenation device 110, operating as service mapping device 118, defines the mechanism of function of each of the resources determined in S103 (i.e., defines how services are to be implemented). In this step, the web API may define the mapping between a selected service of a resource of the web API and a piece of code of the legacy application. This mapping may occur down to the most detailed level of the legal application so that the code of the target web-based application may be generated without user intervention. For example, for each selected service, the exact mechanism of function to be used (or re-used) with the target web-based application may be defined. In the case of certain services, the user can create a custom-designed function, allowing for more flexibility in defining functions. In particular, for example, an interface type to be used to access the native legacy code may be defined, potential input variables and possible mechanisms supported for provision of information to the native legacy code may labeled as "inputs" (providing interfaces in terms of read-only/"import"), potential output variables and possible mechanisms supported to use information returned by the native legacy code are labeled as "outputs" (providing interfaces in terms of write-only/ "export"), and parameters that may be modified are defined. Alternatively, depending on the legacy code, variable may be both input and output.

Then, in S105, application rejuvenation device 110, operating as application generating device 120, generates and builds (e.g., converts the generated code into some executable artifact) the target web-based application and its documentation. Specifically, application rejuvenation device 110 may gather all information of the content of the legacy application collected in S101-S104, and automatically generate a web-based application that corresponds to the legacy application and interfaces with it. After the web-based application is generated, built, and documented, the process terminates.

The flowchart and block diagrams in FIGS. 1-3 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for building a web-based application, comprising:
    defining a scope of the web-based application, via a programming module, based on a plurality of parameters of a non-web-based application;
    defining an error-handling mechanism based on an error-handling mechanism of the non-web-based application;
    defining a plurality of resources for the web-based application;
    defining the mechanism of function for each resource of the plurality of resources; and
    building, using a computer processor, the web-based application.

2. The method of claim 1, wherein defining the scope of the web-based application comprises selecting a plurality of variables that define a selected function of the non-web-based application, and further comprising making the application available to a user over the internet.

3. The method of claim 1, wherein defining the error-handling mechanism comprises incorporating a plurality of error information native to the non-web-based application into the web-based application.

4. The method of claim 3, wherein the plurality of error information comprises:
    an error code associated with a specific error,
    an error message associated the specific error, and
    severity information associated with the specific error.

5. The method of claim 1,
    wherein defining the plurality of resources comprises defining a plurality of attributes, relationships and services, and
    wherein the plurality of services correspond to a plurality of user-selected services of the non-web-based application.

6. The method of claim 5, wherein defining the mechanism of function for each resource of the plurality of resources comprises mapping every function of each service of the plurality of services with the corresponding function of each user-selected service of the plurality of user-selected services of the non-web-based application.

7. A system for building a web-based application, comprising:
    a scope defining device configured to define a scope of the web-based application, via a programming module, based on a plurality of parameters of a non-web-based application;
    an error defining device configured to define an error-handling mechanism based on an error-handling mechanism of the non-web-based application;
    a resource defining device configured to define a plurality of resources for the web-based application;
    a service mapping device configured to define the mechanism of function for each resource of the plurality of resources; and
    an application generating device configured to build the web-based application.

8. The system of claim 7, wherein the scope defining device is further configured to select a plurality of variables that define a selected function of the non-web-based application.

9. The system of claim 7, wherein the error defining device is further configured to incorporate a plurality of error information native to the non-web-based application into the web-based application.

10. The system of claim 9, wherein the plurality of error information comprises:
    an error code associated with a specific error,
    an error message associated the specific error, and
    severity information associated with the specific error.

11. The system of claim 7,
    wherein the resource defining device is further configured to define a plurality of attributes, relationship and services, and
    wherein the plurality of services correspond to a plurality of user-selected services of the non-web-based application.

12. The system of claim 11, wherein the service mapping device is further configured to map every function of each service of the plurality of services with the corresponding function of each user-selected service of the plurality of user-selected services of the non-web-based application.

13. A computer program product for requiring justifications for predetermined user operations, comprising:
    a non-transitory, computer-readable storage medium having computer-readable program code embodied therewith, the computer-readable program code comprising:
        computer readable program code configured to maintain a plurality of security policies in a policy store;
        computer readable program code configured to define a scope of the web-based application, via a programming module, based on a plurality of parameters of a non-web-based application;
        computer readable program code configured to define an error-handling mechanism based on an error-handling mechanism of the non-web-based application;
        computer readable program code configured to define a plurality of resources for the web-based application;

computer readable program code configured to define the mechanism of function for each resource of the plurality of resources; and computer readable program code configured to build the web-based application.

14. The computer program product of claim 13, wherein the computer readable program code is further configured to select a plurality of variables that define a selected function of the non-web-based application.

15. The computer program product of claim 13, wherein the computer readable program code is further configured to incorporate a plurality of error information native to the non-web-based application into the web-based application.

16. The computer program product of claim 15, wherein the plurality of error information comprises:

an error code associated with a specific error, an error message associated the specific error, and severity information associated with the specific error.

17. The computer program product of claim 13, wherein the computer readable program code is further configured to define a plurality of attributes, relationships and services, and wherein the plurality of services correspond to a plurality of user-selected services of the non-web-based application.

18. The computer program product of claim 17, wherein the computer readable program code is further configured to map every function of each service of the plurality of services with the corresponding function of each user-selected service of the plurality of user-selected services of the non-web-based application.

* * * * *